J. J. GREEN.
SCREENING OR SEPARATING MACHINE.
APPLICATION FILED JUNE 29, 1911.
1,019,041.
Patented Mar. 5, 1912.
2 SHEETS—SHEET 1.
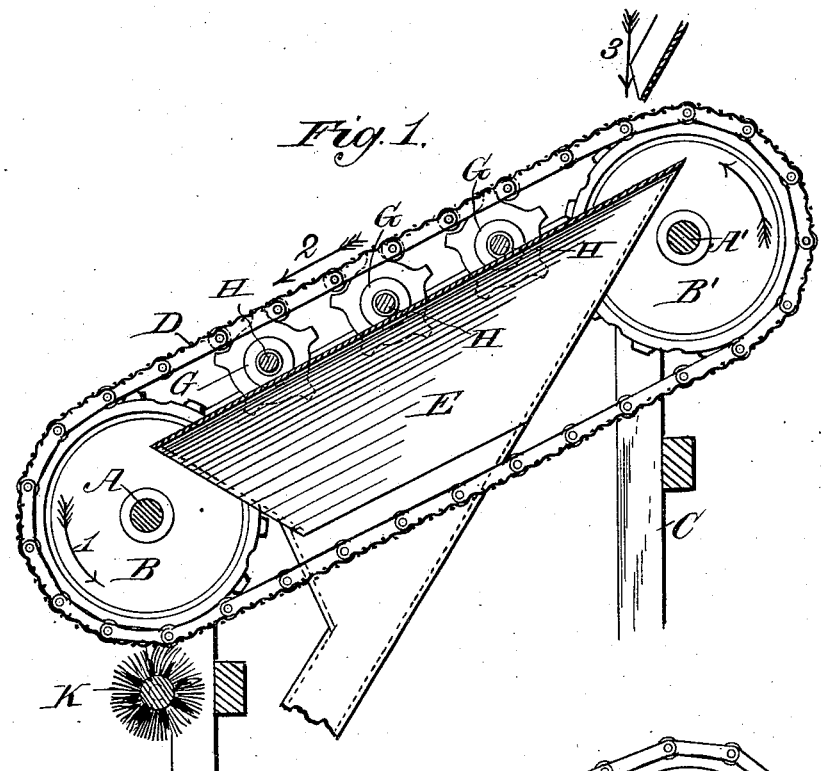
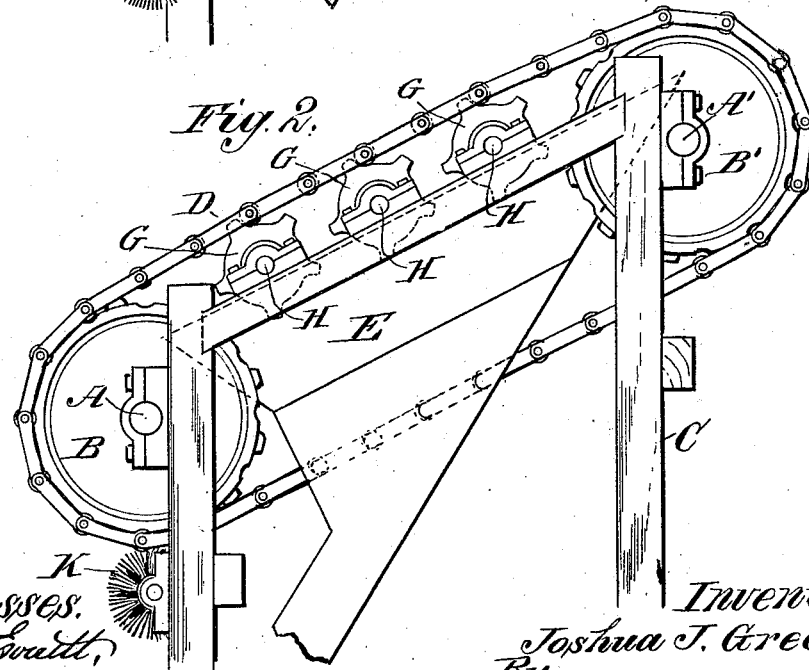
Witnesses.
Inventor
Joshua J. Green.

J. J. GREEN.
SCREENING OR SEPARATING MACHINE.
APPLICATION FILED JUNE 29, 1911.

1,019,041.

Patented Mar. 5, 1912.
2 SHEETS—SHEET 2.

Witnesses:
Robert Everitt
H. B. Marston

Inventor:
Joshua J. Green,
By Marcellus Bailey
Atty.

UNITED STATES PATENT OFFICE.

JOSHUA J. GREEN, OF SHREVEPORT, LOUISIANA.

SCREENING OR SEPARATING MACHINE.

1,019,041.  Specification of Letters Patent.  Patented Mar. 5, 1912.

Application filed June 29, 1911. Serial No. 635,991.

*To all whom it may concern:*

Be it known that I, JOSHUA J. GREEN, of Shreveport, in the parish of Caddo and State of Louisiana, have invented certain new and useful Improvements in Screening or Separating Machines, of which the following is a specification.

The screening machine in which my invention is comprised is one in which the screen proper is an endless traveling apron, the wire cloth, or other screening material, extending between and being secured at its side edges to sprocket chains which pass around sprocket wheels (one pair at each end) mounted on suitable shafts, one of which is power driven for the purpose of imparting traveling motion to the screening apron.

The screening operation takes place on the upper ply of the screening apron, to which the material to be screened is delivered in any suitable way.

In order to support the chains so as to maintain a level screening surface, and at the same time to impart to that surface a jolting, shaking action to facilitate the screening operation, I arrange between the two end sprocket wheels around which the endless traveling screen apron passes, small idler sprocket wheels, arranged below the upper ply of the screen to engage the sprocket chains, serving to uphold the chains and keep them from sagging, and also being so proportioned relatively to the chain links which they engage that the joint pin roller between any two links will pass beyond its seat on the sprocket before the next succeeding joint pin or roller meets its seat, thus permitting the chain by its weight to drop onto the sprocket, to be again slightly lifted as the approaching joint pin or roller seats itself on the sprocket—the result being that by this action of the idler sprockets and chains, a rapid succession of jolts or knocks of the chains takes place, with consequent agitation of the screening surface extending between and attached to said chains.

In the accompanying drawings to which I shall now refer for a better understanding of my invention, I have represented so much of a machine embodying my improvements as needed for the purpose of explanation.

Figure 3:
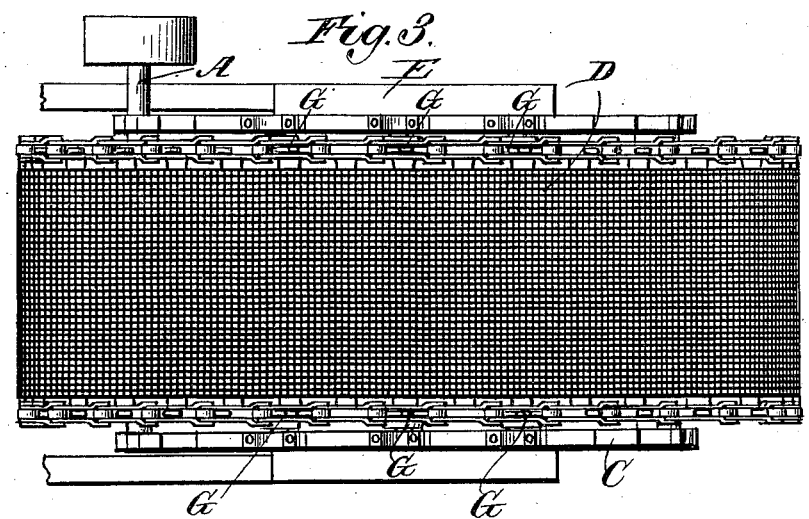
Figure 4:
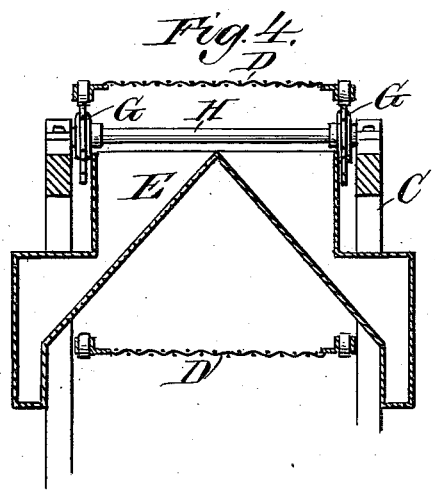
Figure 5:
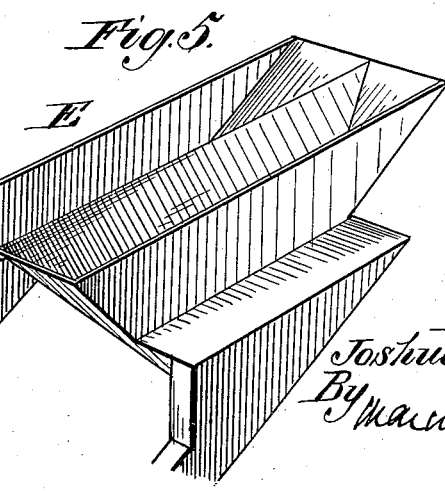

In said drawings—Figure 1 is a longitudinal vertical central section of so much of a mixing machine as needed to illustrate my improvements, with the screening surface in the position it occupies when the sprocket chains of the same are permitted to drop by the knocker sprockets G. Fig. 2 is a side elevation of the same with the screening surface in the position it occupies when the chains are lifted by the seating of the cross rollers or joint pins of the links upon the "knocker" sprockets G. Fig. 3 is a plan of the machine. Fig. 4 is a transverse vertical section of the same. Fig. 5 is a perspective view of the divided hopper which receives the screened material.

In the drawings, A, A' are the shafts carrying the two pairs of sprocket wheels B, B' around which the endless screening apron passes. The shafts A, A' are supported in suitable frame work C, and the front shaft will be power driven, to revolve in the direction of the arrow 1, in Fig. 1. The two sprocket wheels of each pair are secured upon their shaft at a distance apart from one another appropriate to the width of the screening apron employed.

The screening apron consists of an endless apron D of wire cloth or other suitable screening material, and two endless sprocket chains which pass around and engage the sprocket wheels B, B and B', B', and to which the side edges of the endless screening material D are secured in any known or suitable way. The apron travels in the direction of the arrow 2, Fig. 1. I prefer that the front shaft A shall be below the plane of the rear shaft A', as shown, so that the upper ply of the screen surface shall slightly incline downward from rear to front—the arrow 3, Fig. 1, indicating the point at which the material to be screened is delivered to the apron. If desired however, the screen may be horizontal instead of inclined. It is preferred that the chains D should be roller chains, that is to say, should have rollers at the joints between adjoining links.

The upper ply of the endless apron forms the screening surface and the material which passes through the meshes of the screen is delivered into a divided hopper E of suitable construction, intervening between the two plies of the apron and straddling the lower ply—said hopper having spouts F through which the screened material may be discharged from the hopper, and carried to any suitable point of storage or shipment. In lieu of this hopper arrangement, I may employ a moving apron running across the line of travel of the screening apron between the two plies thereon to carry off the screened material; or other known or suitable means can be employed for the purpose.

Material too large to pass through the meshes of the screening apron will be carried by the apron over the front of the machine, to be delivered from that point as desired.

Below the upper ply of the screening apron, and arranged at suitable intervals apart, are pairs of small idler sprocket wheels G, mounted to revolve idle on cross shafts H, suitably fixed in the frame of the machine. There are three pairs of such idler sprockets in the present instance. They are arranged in the longitudinal opening between the two end sprocket wheels B, B', in a position to engage the portions of the sprocket chains of the upper ply between these sprocket wheels, and to uphold the same and prevent them from sagging, said sprockets being substantially tangential, or nearly so, to the chains which they engage. It is preferred that there should be as many of these as practicable and placed as near to one another and to the large end sprocket wheels as good operation of the same will permit, although I do not wish to be understood as restricting myself to this arrangement.

The idler sprockets are small in diameter as compared with the dimensions of the links of the chains which they engage—that is to say, the length of the opening in said links. Take for example a chain composed of long links, having a six inch opening in each. I prefer, in order to get the best results to use the smallest diameter of sprockets manufactured for that size of chain. The result is that when the screen is in movement, and the chains consequently are rotating the idler sprockets, the link joint pin or roller in front will have left the sprocket in its forward travel before the seat on the sprocket for the next succeeding link will have risen high enough in its revolution to reach the plane of the underside of the chain. Consequently the chain at this point and at this instant is unsupported and its weight, as well as the tension, will cause it to drop onto the sprocket until the joint pin or roller brings up against its seat, when the continued revolution of the sprocket will again lift the chain at this point. In this way a continuous up and down jolting of the chains is effected with the result of corresponding continuous agitation of the screening surface D extending between and secured to said chains, the violence of the agitation depending upon the size of the sprocket as compared with the length of the links of the chain with which it is used.

The smaller the diameter of the sprocket employed for a chain of given dimensions with which that sprocket is adapted to be used, the greater will be the jolting action.

The joint pins or rollers of the chain, by reason of their extending below the plane of the links, also serve to induce this jolting action. The roller in front, slightly lifts the chain as it passes over the small portion of the periphery of the sprocket with which it contacts tangentially, and as it leaves contact with the sprocket before the next succeeding roller meets the sprocket, the chain necessarily drops until it brings up at some point against the sprocket. I use in practice a five or six tooth sprocket—preferably a five tooth sprocket, which is the smallest made for a six inch link chain—but of course I do not wish to be understood as confining myself to a wheel of those precise dimensions. With a sprocket of that kind and a chain composed of six inch links, each link will have a drop of $1\frac{1}{8}$ inches for every sprocket tooth. Inasmuch as thirty inches (five links) of chain pass over a sprocket wheel of five teeth at each revolution of the latter, then the sprocket wheel will make forty revolutions per minute when the chain travels one hundred feet per minute. Hence, at this rate, two hundred links will, at their roller joints, rise and fall $1\frac{1}{8}$ inches on each sprocket every minute, thereby producing a lively jolting of the apron. I believe this combination of idler sprockets with the sprocket chains of an endless apron, whereby the apron during its movement is kept in continuous agitation, to be new with me irrespective of the use to which it is put—whether as a conveyer and mixer, as set forth in my application filed June 29, 1911, Serial No. 635,989 or as a screen, as set forth herein.

It will be noted that in my machine, when in action the screening surface is constantly renewed by reason of the continuous travel of the endless apron, thus avoiding danger of the clogging of the meshes of the screen, which exists when ordinary oscillating or vibrating screens are employed or when the material to be sifted is delivered into the ordinary revolving screen or bolt. And indeed the screen in my machine can be kept clean mechanically without trouble, and without being stopped as in the case of ordinary screening machines, for the purpose of brushing to open the meshes. For this purpose I may employ a rotating brush, typified at K, on the return or under ply of the apron to mechanically brush the meshes of the screen during each cycle of movement of the apron. A device of this kind will be of use more particularly in cases where the material operated on is gummy and liable to clog. Where ordinary material is worked, I have found it sufficient, in order to keep the meshes clean, to occasionally hold a hand brush against the moving screen.

Having described my improvements and the best way now known to me of carrying the same into practical effect, I state in conclusion that I do not confine myself strictly to the structural details hereinbefore shown and set forth in illustration of my invention; but

What I claim herein as new and desire to secure by Letters Patent is as follows:

The combination of endless sprocket chains, an endless apron extending between and secured to said chains, driving sprocket wheels around which the sprocket chains pass and by which they are supported, and idler sprockets of relatively small diameter and few teeth as compared with the dimensions of the chain links, located below the upper ply of the apron to engage tangentially, or substantially so, the chains, the apron deriving its support solely from the chains and sprockets, and the idler sprockets being arranged and operating substantially as described to impart to the chains a jolting up and down movement with corresponding agitation of the apron.

In testimony whereof I affix my signature in presence of two witnesses.

JOSHUA J. GREEN.

Witnesses:
R. P. MOORE,
ED. SEAMAN.

Copies of this patent may be obtained for five cents each, by addressing the "Commissioner of Patents, Washington, D. C."